United States Patent
Mahalank et al.

(10) Patent No.: US 10,742,744 B1
(45) Date of Patent: Aug. 11, 2020

(54) METHODS, SYSTEMS, AND COMPUTER READABLE MEDIA FOR MONITORING LIGHTWEIGHT MACHINE TO MACHINE (LWM2M) INTERNET OF THINGS (IOT) DEVICES THROUGH SERVICE CAPABILITY EXPOSURE FUNTION (SCEF) T8 INTERFACE

(71) Applicant: Oracle International Corporation, Redwood Shores, CA (US)

(72) Inventors: Shashikiran Bhalachandra Mahalank, Bangalore (IN); Rajul Surana, Bangalore (IN); Kiranmayi Boyapati, Bangalore (IN); Ashok Kumar Karyampudi, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/399,428

(22) Filed: Apr. 30, 2019

(30) Foreign Application Priority Data

Apr. 8, 2019 (IN) .............................. 201941014052

(51) Int. Cl.
*H04L 29/08* (2006.01)
*G06F 16/9538* (2019.01)
(Continued)

(52) U.S. Cl.
CPC ........ *H04L 67/125* (2013.01); *G06F 16/9538* (2019.01); *H04L 41/0686* (2013.01); *H04L 43/065* (2013.01); *H04L 67/025* (2013.01)

(58) Field of Classification Search
CPC ......... H04W 4/70; H04W 8/04; H04W 12/06; H04W 88/16; H04L 12/2803; H04L 41/022; H04L 43/065; H04L 67/12; H04L 67/20
See application file for complete search history.

(56) References Cited

U.S. PATENT DOCUMENTS 8,023,482 B2    9/2011    Gong et al.
9,781,259 B1 *   10/2017   Kodaypak ............. H04L 67/303
(Continued)

OTHER PUBLICATIONS

Notice of Allowance and Fee(s) Due for U.S. Appl. No. 16/280,672 (dated Sep. 25, 2019).

(Continued)

*Primary Examiner* — Arvin Eskandarnia
(74) *Attorney, Agent, or Firm* — Jenkins, Wilson, Taylor & Hunt, P.A.

(57) ABSTRACT

A method for monitoring LWM2M IoT device state includes, in an SCEF, providing an interface for receiving subscription requests from IoT application servers or service capability servers for monitoring LWM2M IoT device state, the method further includes maintaining, in the SCEF, a database of identifiers of IoT devices that utilize LWM2M protocols, receiving, via the interface and from an SCS or AS, a first monitoring event request for subscribing to receive state information regarding an IoT device, and performing a lookup in the database using an IoT device identifier extracted from the first monitoring event request and identifying the first monitoring event request as being associated with an LWM2M IoT device. The method further includes communicating with the LWM2M IoT device using LWM2M constrained application protocol (CoAP) messaging to subscribe to and receive state information from the LWM2M IoT device and communicating the state information to the SCS or AS.

20 Claims, 10 Drawing Sheets

(51) Int. Cl.
H04L 12/26 (2006.01)
H04L 12/24 (2006.01)

(56) References Cited

U.S. PATENT DOCUMENTS

| | | | |
|---|---|---|---|
| 10,104,567 B2 | 10/2018 | Kodaypak | |
| 10,212,639 B2 | 2/2019 | Kodaypak | |
| 10,375,530 B2 | 8/2019 | Buckley et al. | |
| 10,555,202 B1 | 2/2020 | Narayanan et al. | |
| 2015/0016266 A1 | 1/2015 | Dumitrescu et al. | |
| 2015/0110000 A1 | 4/2015 | Zhang et al. | |
| 2015/0263987 A1 | 9/2015 | Klein et al. | |
| 2016/0164788 A1 | 6/2016 | Goel et al. | |
| 2016/0315743 A1 | 10/2016 | Nagaraj et al. | |
| 2016/0373591 A1 | 12/2016 | Sharma et al. | |
| 2017/0195822 A1 | 7/2017 | Watfa et al. | |
| 2017/0347283 A1* | 11/2017 | Kodaypak | H04L 41/022 |
| 2018/0035351 A1* | 2/2018 | Kodaypak | H04W 76/10 |
| 2018/0249281 A1 | 8/2018 | McCann | |
| 2018/0324671 A1* | 11/2018 | Palnati | G06F 9/547 |
| 2018/0376417 A1* | 12/2018 | Wang | H04L 67/12 |
| 2019/0007329 A1 | 1/2019 | Velev et al. | |
| 2019/0141527 A1 | 5/2019 | Krishan | |
| 2019/0191274 A1* | 6/2019 | Fontaine | H04L 67/18 |
| 2019/0306251 A1* | 10/2019 | Talebi Fard | H04W 48/18 |
| 2020/0021953 A1* | 1/2020 | Mahalank | H04W 4/14 |
| 2020/0028973 A1* | 1/2020 | Livanos | H04L 43/065 |
| 2020/0084277 A1* | 3/2020 | Somaraju | H04W 12/06 |

OTHER PUBLICATIONS

"3rd Generation Partnership Project; Technical Specification Group Services and System Aspects; Architecture enhancements to facilitate communications with packet data networks and applications (Release 16)," 3GPP TS 23.682, V16.1.0, pp. 1-126 (Dec. 2018).

"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.6.0, pp. 1-79 (Mar. 2019).

"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).

"OMA Lightweight Machine to Machine Requirements," Candidate Version 1.2, Open Mobile Alliance, pp. 1-20 (Jan. 24, 2019).

"Lightweight Machine to Machine Technical Specification: Transport Bindings," Candidate Version: 1.1, Open Mobile Alliance, pp. 1-67 (Jun. 12, 2018).

"Lightweight Machine to Machine Technical Specification: Core," Candidate Version: 1.1, Open Mobile Alliance, pp. 1-142 (Jun. 12, 2018).

Bormann et al., "Block-Wise Transfers in the Constrained Application Protocol (CoAP)," RFC 7959, pp. 1-37 (Aug. 2016).

Hartke, "Observing Resources in the Constrained Application Protocol (CoAP)," RFC 7641, pp. 1-30 (Sep. 2015).

Shelby et al., "The Constrained Application Protocol (CoAP)," RFC 7252, pp. 1-112 (Jun. 2014).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

Commonly-assigned, co-pending U.S. Appl. No. 16/415,758 for "Methods, Systems, and Computer Readable Media for Providing Reduced Signaling Internet of Things (Iot) Device Monitoring," (Unpublished, filed May 17, 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G ; Stage 2 (Release 16)," 3GPP TS 23.501. V16.0.0, pp. 1-318 (Mar. 2019).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).

Commonly-assigned, co-pending U.S. Appl. No. 16/287,808 for "Methods, Systems, and Computer Readable Media for Dynamically Provisioning and Using Public Land Mobile Network (PLMN) Location Mappings in Service Capability Exposure Function (SCEF) or Network Exposure Function (NEF)," (Unpublished, filed Feb. 27, 2019).

Commonly-assigned, co-pending U.S. Appl. No. 16/280,672 for "Methods, Systems, and Computer Readable Media for (IoT) Device State Through Service Capability Exposure Function (SCEF)," (Unpublished, filed Feb. 20, 2019).

"Oracle Communications Diameter Signaling Router," Release Notice, Release 8.3, E93179 Revision 02, Oracle, pp. 1-98 (Dec. 2018).

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).

"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).

"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).

"Addressing 5G Network Function Requirements," Intel® FPGAs and Intel PAC 5G QoS and IPSec Benchmarking, White Paper, pp. 1-8 (Oct. 2018).

"Diameter Singaling Router SCEF User's Guide," Release 8.3, E93572, Oracle® Communications, pp. 1-110 (Sep. 2018).

"3rd Generation Partnership Project; Technical Specification Group Services and System Aspects; Universal Geographical Area Description (GAD) (Release 15)," 3GPP TS 23.032, V15.1.0, pp. 1-32 (Sep. 2018).

"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).

"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).

Mayer, Georg (Huawei), "3GPP 5G CoreNetwork Status," 3GPP A Global Initiative, pp. 1-23 (Nov. 2017).

"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).

Benacer et al., "A High-Speed Traffic Manager Architecture for Flow-Based Networking," pp. 1-4 (2017).

"Dynamically Reconfigurable Optical-Wireless Backhaul/Fronthaul with Cognitive Control Plane for Small Cells and Cloud-RANs: D3.1 Analysis of state of the art on scalable control plane design and

(56) References Cited

OTHER PUBLICATIONS techniques for user mobility awareness. Definition of 5G-XHaul control plane requirements," European Commission, 5G-XHaul, pp. 1-107 (Jun. 31, 2016).

* cited by examiner

METHODS, SYSTEMS, AND COMPUTER READABLE MEDIA FOR MONITORING LIGHTWEIGHT MACHINE TO MACHINE (LWM2M) INTERNET OF THINGS (IOT) DEVICES THROUGH SERVICE CAPABILITY EXPOSURE FUNTION (SCEF) T8 INTERFACE

PRIORITY CLAIM

This application claims the benefit of Indian Provisional Patent Application Number 201941014052 filed Apr. 8, 2019, the disclosure of which is incorporated herein by reference in its entirety.

TECHNICAL FIELD

The subject matter described herein relates to monitoring IoT devices state. More particularly, the subject matter described herein relates to monitoring LWM2M IoT devices by reusing the T8 monitoring interface of the SCEF.

BACKGROUND

The SCEF is the 3GPP platform that enables IoT application servers to monitor IoT device state. The procedure for monitoring IoT devices is referred to as the 3GPP MTC monitoring event procedure and allows an IoT application server (AS) or service capability server/application server (SCS/AS) to monitor IoT device status and is described in 3GPP TS 23.682, Technical Specification Group Services and System Aspects; Architecture enhancements to communications with packet data networks and applications (Release 16), V16.2.0 (March 2019). The interface that an SCS or AS uses to invoke the 3GPP MTC monitoring event procedure is referred to as the T8 interface, which is specified in 3GPP TS 29.122, Technical Specification Group Core Network and Terminals; T8 reference point for Northbound APIs; (Release 16) V16.1.0 (March 2019).). The T8 interface is provided by the SCEF.

According to the 3GPP MTC monitoring event procedure, the IoT AS or SCS/AS sends a monitoring configuration (subscription) request to the SCEF over the T8 interface to monitor the required device parameter. The IoT AS can request continuous or one-time reporting of device status in the T8 monitoring configuration request to SCEF. The SCEF creates a monitoring context for a given monitoring configuration (subscription) request and assists in delivering the requested IoT device status. The SCEF retrieves the required device status information from EPC core network elements, such as the home subscriber server (HSS), mobility management entity (MME), or policy and charging rules function (PCRF), and generates device status reports towards the IoT AS. The MTC monitoring event procedure supports monitoring of IoT device status information (i.e., monitoring events), such as location information, roaming status, device reachability, connectivity status, communication failure, etc., from IoT AS through EPC network elements, such as the HSS, MME and PCRF.

FIG. 1 is a call flow diagram illustrating the 3GPP monitoring event procedure through the HSS using the northbound T8 interface. In FIG. 1, an SCEF 100 receives monitoring event subscription requests from an SCS/AS 102 and communications with an HSS 104 to obtain the requested IoT device state information. The monitoring of devices through the HSS using the T8 interface consists of two phases:

Configuration Phase:
  1) SCS/AS 102 sends a monitoring subscription request containing a monitoring event, such as location info, UE reachability, etc., to SCEF 100
  2) SCEF 100 validates the monitoring event subscription request and sends a Diameter configuration information request (CIR) to HSS 104 over the s6t interface with a unique SCEF-Reference ID generated for the user.
  3) HSS 104 sends a Diameter configure information answer (CIA) message to SCEF 100 with a success cause code.
  4) SCEF 100 responds with an HTTP response 201 created message to SCS/AS 102.
Reporting Phase:
  1) When monitoring data is available for the UE on HSS 104, HSS 104 will send a Diameter reporting information request (RIR) to SCEF 100.
  2) SCEF 100 validates the request and notifies SCS/AS 102 with a monitoring status notification message carrying the monitoring information.
  3) SCS/AS 102 sends a success T8 response cause code back to SCEF 100.
  4) SCEF 100 indicates a successful subscription to HSS 104 in a Diameter reporting information answer (RIA) message.

FIG. 2 illustrates the monitoring event procedure through the HSS when the HSS does not have the requested information. Referring to FIG. 2, when HSS 104 does not have the requested UE status information, HSS 104 contacts MME 106 for the information. The configuration phase in FIG. 2 may include the following steps:
Configuration Phase:
  1) SCS/AS 100 sends a monitoring subscription request containing the monitoring event, such as location info, UE reachability, etc., to SCEF 100
  2) SCEF 100 validates the monitoring event request and sends a Diameter CIR message to HSS 104 over the S6t interface with a unique SCEF-Reference ID generated for the user.
  3) HSS 104 sends a Diameter insert subscription data request (IDR) to an MME 106 requesting the monitoring information for the identified user.
  4) MME 106 accepts the monitoring request and returns an insert subscription data answer (IDA) to HSS 106 with a success cause code.
  5) HSS 104 sends a Diameter CIA message to SCEF 100 with a success cause code.
  6) SCS/AS 102 receives the monitoring subscription response from SCEF 100 with a 201 created HTTP response code.
The reporting phase in FIG. 2 may include the following steps:
Reporting Phase:
  1) When monitoring data is available for a UE on MME 106, MME 106 will send a Diameter RIR to SCEF 100 over the t6a interface with the same SCEF-Reference id generated for the user during the configuration phase.
  2) SCEF 100 validates the reporting information request and notifies SCS/AS 102 with a monitoring status notification message carrying the monitoring information.
  3) SCS/AS 102 sends a success T8 response cause code to SCEF 100.
  4) SCEF 100 sends a Diameter success to MME 106 in an RIA message.

A procedure separate from the 3GPP monitoring event procedure is used to monitor LWM2M devices. This procedure or protocol is referred to as the LWM2M protocol and uses constrained application protocol (CoAP) as transport. The LWM2M protocol does not involve the SCEF. Instead, an IoT AS is required to implement LWM2M and CoAP procedures to communicate with IoT devices directly (through a packet gateway or serving gateway). The LWM2M protocol is used for device communication and management between IoT devices and the SCS/AS.

According to the LWM2M protocol, an information reporting interface is used by an LWM2M server to observe any changes in a resource on a registered LWM2M client, receiving notifications when new values are available. This observation relationship is initiated by sending an observe or observe-composite operation to the LWM2M client for an object, an object instance, or a resource. An observation ends when a cancel observation or cancel observation-composite operation is performed.

As stated above, the CoAP is used as transport for LWM2M messages. The CoAP is a specialized web transfer protocol for use with constrained nodes, such as IoT devices and constrained (e.g., low-power, lossy) networks. The protocol is designed for machine-to-machine (M2M) applications, such as smart energy and building automation. CoAP messages are very small and hence limit the need for fragmentation of messages in the network. The CoAP protocol enables CoAP clients to observe resources, i.e., to retrieve a representation of a resource (IoT device status) and keep this representation updated by the server over a period of time.

FIG. 3 is a diagram illustrating the use of the LWM2M protocol and CoAP to observe sensor data for a defined duration. In FIG. 3, an LWM2M client 300 is an IoT device. An LWM2M server 302 is an SCS/AS. More precisely, the SCS/AS is required to implement LWM2M and CoAP procedures to obtain state information from the IoT device. In FIG. 3, LWM2M server 302 makes an observation for a required resource (e.g., temperature) that is updated inside LWM2M client 300 at irregular periods (based on change) using a CoAP request message (GET method) carrying Observe Option=0. Notifications are sent by the IoT device (LWM2M client 300) in reply to the single extended GET request that created the registration (subscription). Each notification includes the token specified by the SCS/AS in the observation request. Notifications typically have a 2.05 (Content) response code. The notifications include an observe option with a sequence number for reordering detection.

When LWM2M client 300 receives a reset in response to a notify operation, LWM2M client 300 must cancel the observation regardless of whether the notify was sent as a confirmable CoAP message as defined in the observe operation or as a non-confirmable CoAP message. LWM2M server 302 can also cancel the observe operation at any time, on a specified resource, resource instance or specified object instance(s), by sending a GET request with observe option=1. LWM2M server 302 may optionally set the observe attributes of a Resource to affect the behavior of its notifications using the write-attributes operation implemented using a CoAP PUT request.

One problem with using the above-described procedures for different types of IoT devices is that the SCS/AS will be required to implement two separate northbound interfaces to monitor the IoT device status:

the 3GPP defined T8 monitoring event interface; and
the LWM2M server implementation to observe the resource state of an IoT device using the CoAP protocol interface. There is no unified SCS/AS interface for monitoring IoT device state or intelligence in the SCS/AS for identifying the type of IoT device and protocol for monitoring IoT device state using the correct protocol. The network operator can perform authentication, authorization, and access control of SCS/AS northbound traffic only for 3GPP-based T8 interface traffic at the SCEF but cannot enforce the same for LWM2M CoAP traffic going directly through an over the top communication method (i.e., using the data plane through a packet gateway).

Accordingly, there exists a need for improved methods, systems, and computer readable media for monitoring IoT device state using a unified interface provided by the SCEF for LWM2M and non-LWM2M IoT devices.

SUMMARY

The subject matter described herein includes a method where IoT application servers and service capability servers can monitor LWM2M protocol-based IP IoT devices by reusing the 3GPP defined T8 monitoring event interface through the SCEF network element. This solution allows IoT application servers to monitor the IoT device status using a unified T8 monitoring event interface irrespective of device status report delivery method, either through 3GPP-defined monitoring event procedures or the LWM2M constrained application protocol-based observe interface using the SCEF.

A method for monitoring LWM2M IoT device state includes, in an SCEF, providing an interface for receiving subscription requests from IoT application servers (ASs) or service capability servers (SCSs) for monitoring LWM2M IoT device state, the method further includes maintaining, in the SCEF, a database of identifiers of IoT devices that utilize LWM2M protocols, receiving, via the interface and from an SCS or AS, a first monitoring event request for subscribing to receive state information regarding an IoT device, and performing a lookup in the database using an IoT device identifier extracted from the first monitoring event request and identifying the first monitoring event request as being associated with an LWM2M IoT device. The method further includes communicating with the LWM2M IoT device using LWM2M constrained application protocol (CoAP) messaging to subscribe to and receive state information from the LWM2M IoT device and communicating the state information to the SCS or AS.

According to another aspect of the subject matter described herein, the interface of the SCEF used to receive monitoring event requests for LWM2M and non-LWM2M IoT devices comprises a T8 interface.

According to yet another aspect of the subject matter described herein, receiving a second monitoring event request via the T8 interface, performing a lookup in the database using an IoT device identifier extracted from the second monitoring event request, identifying the second monitoring event request as being associated with a non-LWM2M IoT device, and communicating with a public land mobile network (PLMN) network node (such as a home subscriber server (HSS)) using 3GPP event monitoring procedures to subscribe to receive state information regarding the non-LWM2M IoT device.

According to yet another aspect of the subject matter described herein, receiving the monitoring event request includes receiving a 3GPP T8 monitoring event request.

According to yet another aspect of the subject matter described herein, communicating with the LWM2M device includes implementing an LWM2M observe procedure to subscribe to receive state information regarding the LWM2M IoT device.

According to yet another aspect of the subject matter described herein, implementing the LWM2M observe procedure includes sending a CoAP GET request with an observe option from the SCEF to the LWM2M IoT device.

According to yet another aspect of the subject matter described herein, implementing the LWM2M observe procedure includes receiving a 2.05 CoAP response including the IoT device state information from the LWM2M IoT device and generating and sending a T8 monitoring event response message including the IoT device state information to the SCS or AS.

According to yet another aspect of the subject matter described herein, a registration database of LWM2M IoT devices registered with the SCEF is maintained in the SCEF.

According to yet another aspect of the subject matter described herein, the SCEF includes a single IoT service application programming interface (API) for receiving monitoring event subscription requests for LWM2M and non-LWM2M IoT devices.

According to yet another aspect of the subject matter described herein, communicating with the LWM2M IoT device includes communicating with the LWM2M IoT device using an over the top (OTT) communication path via a serving gateway or packet gateway and an evolved node B (eNB).

A system for monitoring light weight machine to machine (LWM2M) Internet of things (IoT) device state includes an SCEF having at least one processor. The system further includes an interface provided by the SCEF for receiving subscription requests from IoT application servers (ASs) or service capability servers (SCSs) for monitoring LWM2M IoT device state. The system further includes a database in the SCEF of identifiers of IoT devices that utilize LWM2M protocols. The system further includes an application programming interface (API) front end in the SCEF for receiving, via the interface and from an SCS or AS, a first monitoring event request for subscribing to receive state information regarding an IoT device, performing a lookup in the database using an IoT device identifier extracted from the first monitoring event request and identifying the first monitoring event request as being associated with an LWM2M IoT device. The system further includes a constrained application protocol/message queuing telemetry transport (CoAP/MQTT) gateway in the SCEF for communicating with the LWM2M IoT device using LWM2M CoAP messaging to subscribe to and receive state information from the LWM2M IoT device. The system further includes a core SCEF API handler in the SCEF for communicating the state information to the SCS or AS.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 7 is a message flow diagram illustrating IoT device registration using an SCS/AS;

DETAILED DESCRIPTION

The subject matter described herein includes a method where IoT application servers and service capability servers can monitor the LWM2M protocol-based IP IoT devices by reusing 3GPP defined T8 monitoring event interface through the SCEF network element. Such an implementation allows IoT application servers and service capability servers to monitor the IoT device status using a unified T8 monitoring event interface provided by the SCEF irrespective of the device status report delivery method—either through 3GPP-defined monitoring event procedures or the CoAP protocol.

The subject matter described herein includes an SCEF that provides the unified T8 interface, allowing SCS/AS to monitor device state using 3GPP defined monitoring event procedure and LWM2M observe interface. The SCS/AS can use the 3GPP T8 defined monitoring event interface to monitor the device state towards the SCEF. The SCEF provides the following features:

Mapping of IoT device identifiers to SCS/AS identifiers and a method of device state monitoring, i.e., 3GPP defined monitoring event procedure or LWM2M-based CoAP observe call flows;

Mapping of 3GPP defined T8 monitoring events to observable LWM2M resource Ids; and Transport binding for LWM2M implementation supporting the following operational modes:

User datagram protocol/datagram transport layer security (UDP/DTLS)—UDP/DTLS-based communication between device and the SCEF;

Transmission control protocol/transport layer security (TCP/TLS)—TCP/TLS-based communication between the IoT device and the SCEF; and Non-IP data delivery (NIDD)—3GPP Non-IP data delivery-based device communication between the IoT device and the SCEF.

Based on the mapping configuration, upon receiving a T8 monitoring event subscription request from an SCS/AS on a northbound (facing the SCS/AS) interface, the SCEF shall initiate the 3GPP monitoring event subscription procedures using the 3GPP S6t and T6a/b interface or initiate the LWM2M CoAP observe procedure directly towards the IoT device on the southbound interface (facing the IoT device). Thus, the SCEF described herein has the intelligence for identifying the type of IoT device (LWM2M or non-LWM2M) and implementing the appropriate communication protocol on the southbound interface to communicate with the identified IoT device type.

The SCEF may implement an LWM2M gateway supporting LWM2M observe and notification call flows on the southbound interface to convert the T8 monitoring messages to LWM2M CoAP messages as will now be described in detail.

3GPP monitoring event procedures allow the SCS/AS to monitor IoT device state without interrogating/communicating with the device, i.e., evolved packet core (EPC) nodes, such as the MME or the HSS, send IoT device state to the SCS/AS through the SCEF; whereas the LWM2M observe call flow involves the IoT device sending the device state to the SCS/AS.

Figure 4:
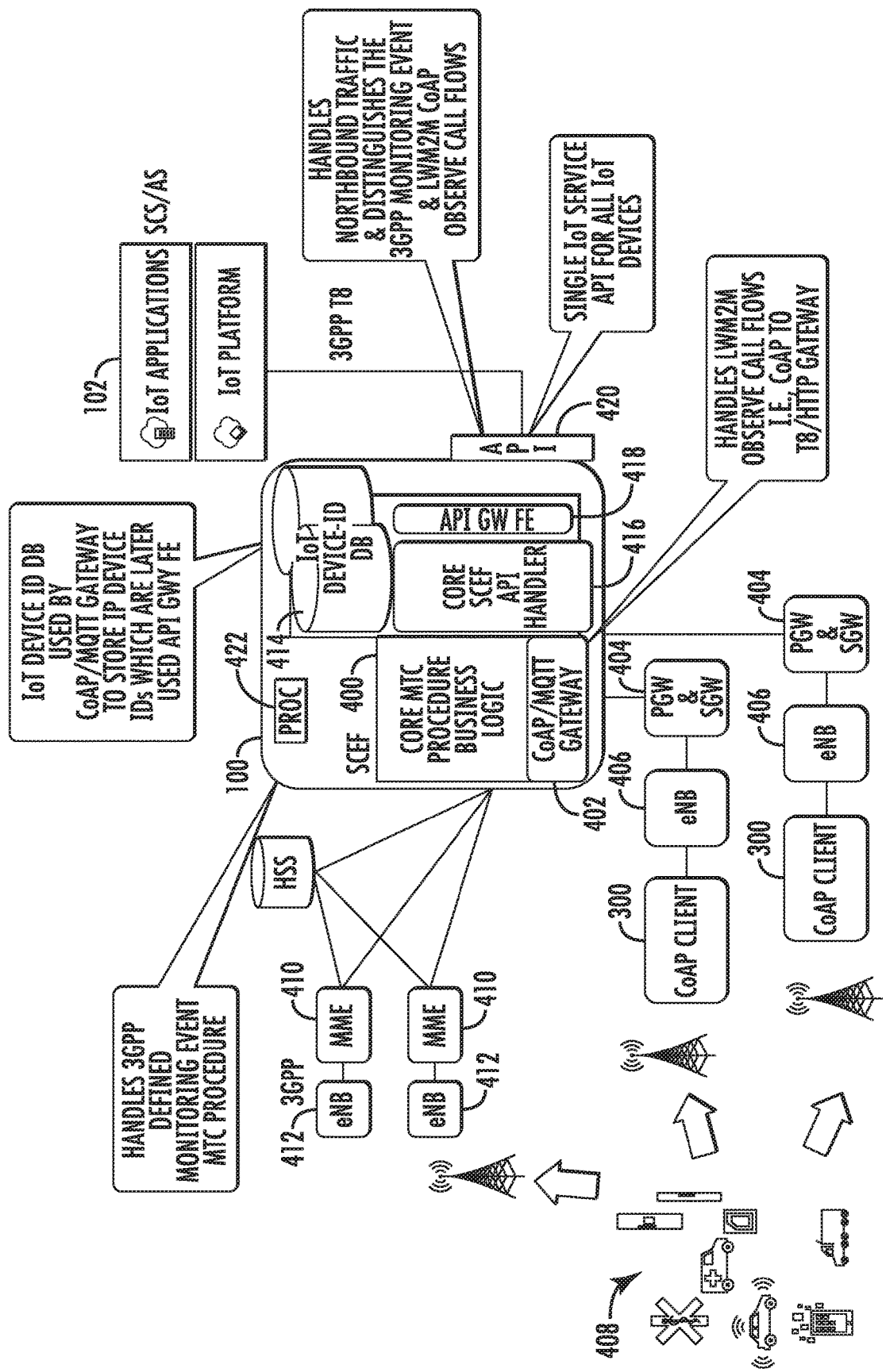
FIG. 4 is a network diagram illustrating an SCEF implementing a single IoT device service API for monitoring LWM2M and non-LWM2M IoT devices.

FIG. 4 depicts an SCEF architecture with an integrated LWM2M gateway supporting a unified northbound T8 interface used to monitor IoT device state. In FIG. 4, the LWM2M-based observe interface for monitoring LWM2M IoT device sensor data is triggered using messages received via the 3GPP-defined northbound T8 interface. The SCS/AS sends a 3GPP monitoring configuration request (subscription request) to the SCEF to monitor IoT device state, regardless of whether the IoT device is an LWM2M or non-LWM2M device.

In FIG. 4, SCEF 100 includes core MTC procedures business logic 400 for handling 3GPP monitoring event procedures (both northbound and southbound). Thus, core MTC procedures business logic 400 may receive monitoring event request messages from SCS/AS 102 and provide monitoring event response messages to SCS/AS 102 via the T8 interface. SCEF 100 may further include a CoAP/MQTT gateway 402 that handles CoAP observe call flows with CoAP clients 300 via serving gateway/packet gateways (SGW/PGWs) 404 and evolved node Bs 406. CoAP/MQTT gateway 402 may implement the CoAP observe call flows to monitor the state of IoT devices 408, at least some of which may be LWM2M devices. In the illustrated example, IoT devices 408 include vehicle mounted IoT devices, IoT devices implemented by smart phone applications, sensors, etc. IoT devices 408 may also include non-LWM2M devices, such as those that are compatible with 3GPP monitoring event procedures. The non-LWM2M devices may communicate their state information to MMEs 410 and HSS 104 via eNBs 412 using non-LWM2M protocols, such as 3GPP monitoring event protocols.

Figure 1:
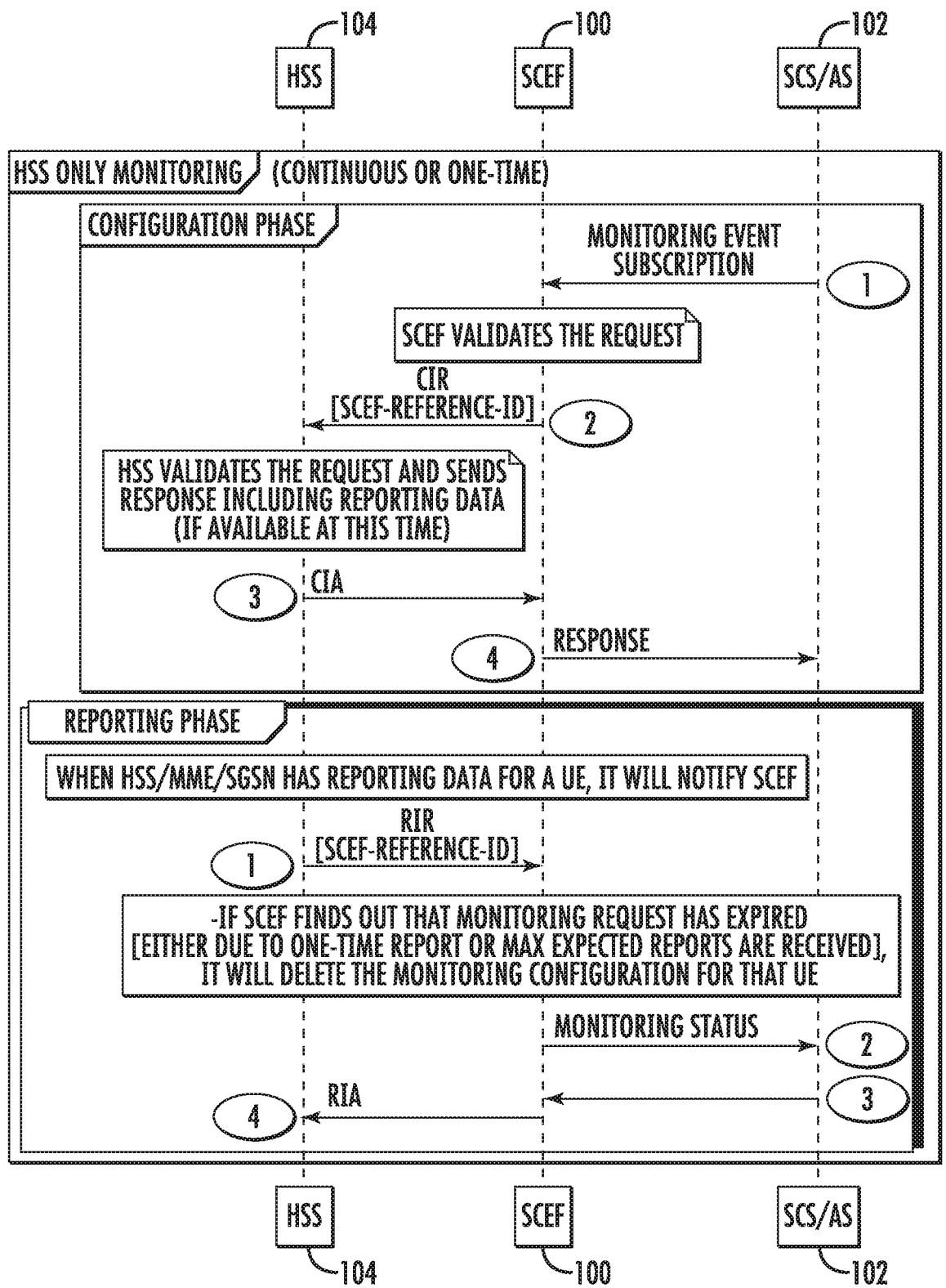
FIG. 1 is a message flow diagram illustrating exemplary messages exchanged for the 3GPP monitoring event procedure in which the HSS has the requested IoT device status information.
Figure 2:
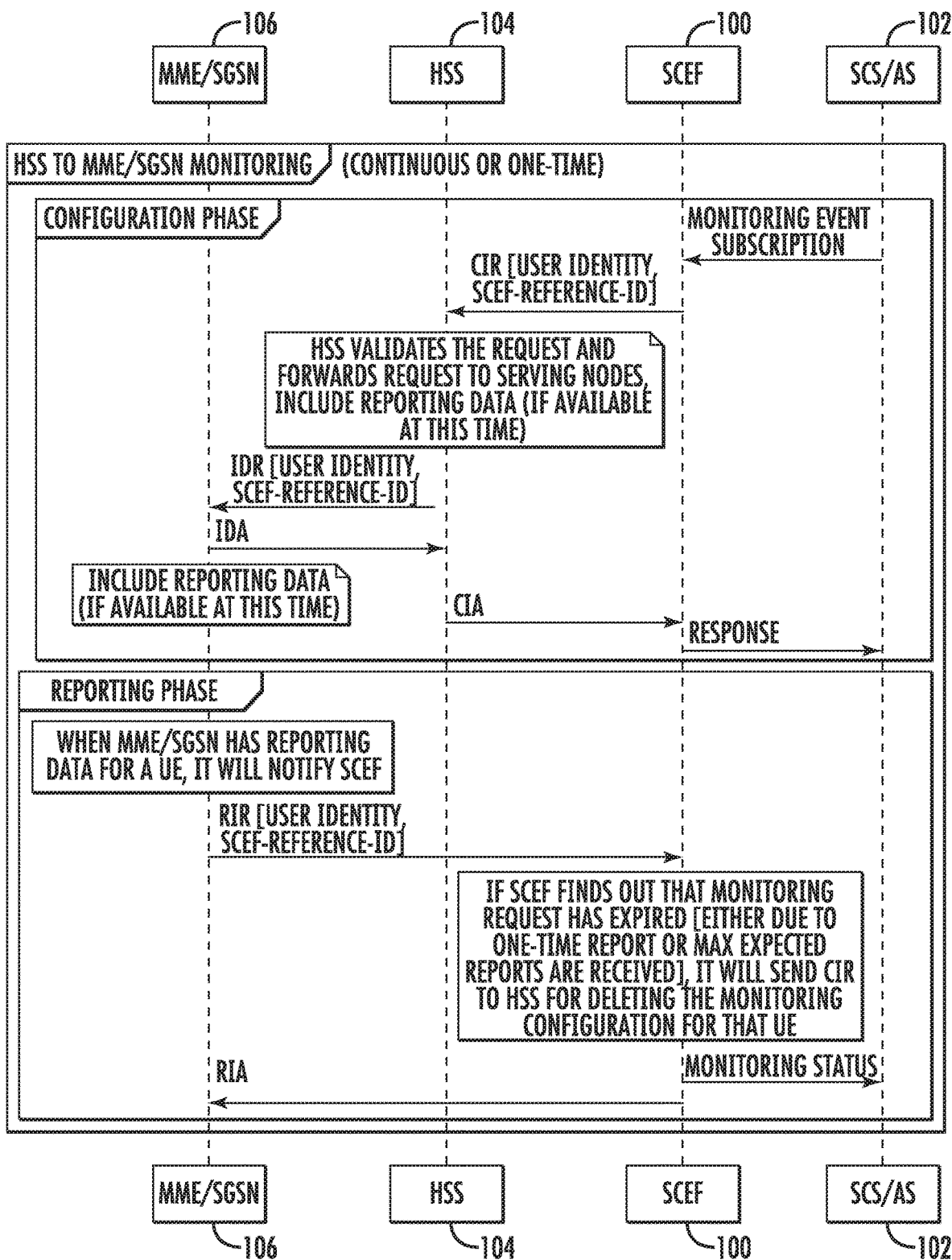
FIG. 2 is a message flow diagram illustrating exemplary messages exchanged for the 3GPP monitoring event procedure in which the HSS does not have the requested IoT device status information and obtains the information from an MME.

SCEF 100 may further include an IoT device database 414 that stores identifiers of LWM2M and/or non-LWM2M IoT devices. Database 414 may be used by CoAP/MQTT gateway 402 to record identities of LWM2M devices. A core SCEF API handler 416 handles northbound traffic and distinguishes between 3GPP monitoring event and CoAP observe call flows. An API gateway front end (FE) 418 receives 3GPP monitoring event subscription requests from SCS/AS 102 via API 420, accesses database 414 to determine whether the devices identified in the requests are LWM2M or non-LWM2M devices. For devices identified as LWM2M devices, API gateway FE 418 may trigger CoAP/MQTT gateway 402 to implement CoAP observe procedures to monitor device state. For devices identified as non-LWM2M devices, API gateway FE 416 may trigger core MTC procedures business logic 400 to communicate with HSS 104 using the 3GPP procedures described above with respect to FIGS. 1 and 2 to subscribe to and obtain IoT device state. API 420 comprises a single service API that allows SCS/AS 102 to subscribe to and receive state information regarding any type of IoT device, including LWM2M and non-LWM2M IoT devices, using 3GPP monitoring event procedures via the T8 interface.

SCEF 100 may also include at least one processor 422 for implementing the components in FIG. 4. Processor 422 may be one or more general purpose microprocessors, FPGAs, hardware ASICs, or any combination thereof. SCEF 100 may be implemented using on-premises hardware of a network service provider, as a cloud service implemented on cloud network hardware platforms, or as a combination of on-premises and cloud network hardware platforms.

Figure 5:
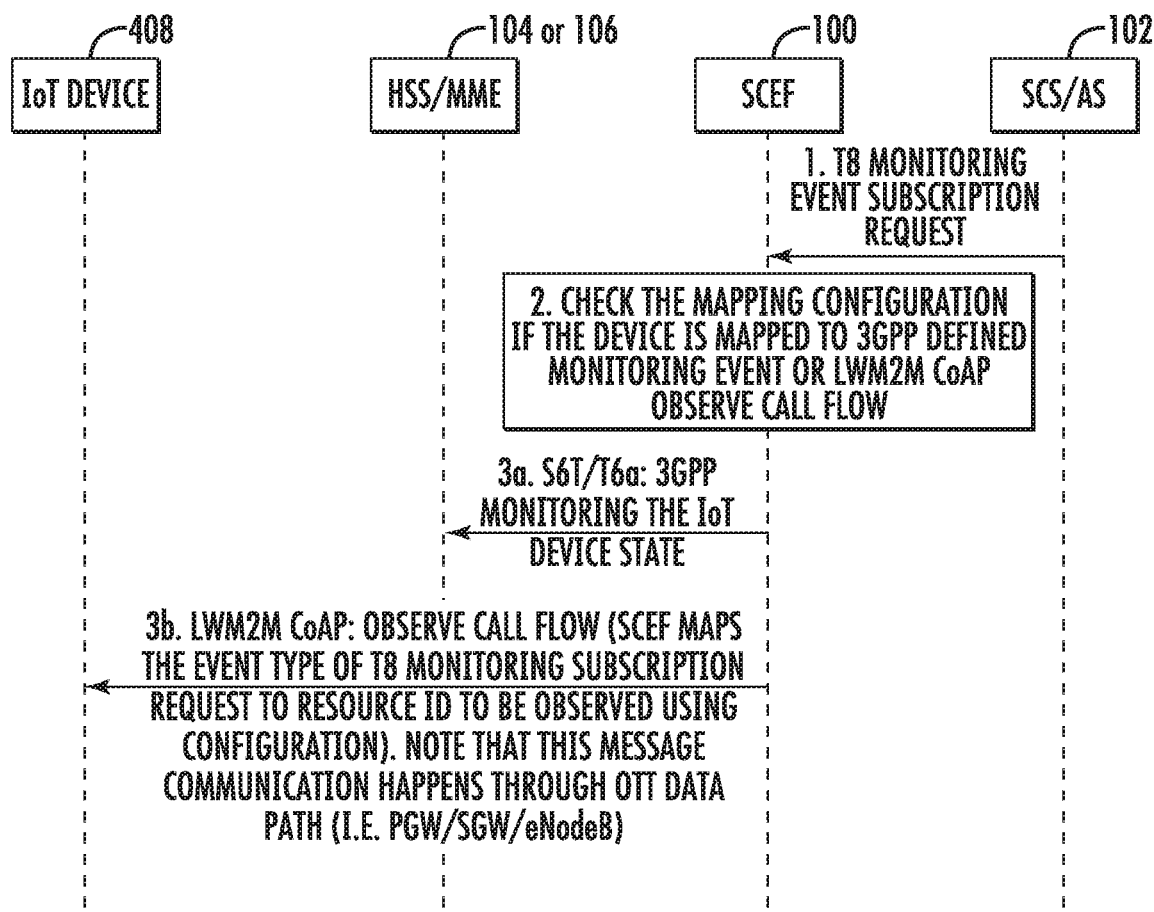
FIG. 5 is a message flow diagram illustrating exemplary messaging exchanged between an SCS/AS, an SCEF, an HSS/MME, and an IoT device using the unified IoT device monitoring interface provided by the SCEF.

FIG. 5 is a message flow diagram illustrating the use of the T8 interface of the SCEF to trigger the LWM2M observe procedure for monitoring the state of an LWM2M IoT device. In FIG. 5, SCS/AS 102 communicates with SCEF 100 using T8 monitoring event procedures, regardless of whether the IoT devices are LWM2M or non-LWM2M IoT devices. SCEF 100 communicates with HSS 104 or MME 106 for subscribing to and receiving IoT device state for non-LWM2M IoT devices. SCEF 100 implements CoAP observe procedures for subscribing to and receiving device state information for LWM2M IoT devices. The following steps correspond to the numbered steps in FIG. 5:

1. SCS/AS 102 sends a monitoring subscription request to monitor the device state of an IoT device by including an identifier for the type event to be monitored in a T8 request to SCEF 100;
2. SCEF 100 checks the mapping configuration in IoT device Id database 414 based on the device Id (MSISDN/external Id) received in the T8 monitoring subscription request and identifies the method of monitoring the device state, i.e., either 3GPP monitoring event procedure or LWM2M CoAP observe delivery;
3a. If the monitoring method is the 3GPP monitoring event procedure, then SCEF 100 monitors the device state through HSS/MME 104 or 106 as defined in 3GPP TS 23.682 using S6t/T6a interfaces (also explained in Background section above)
3b. If the monitoring method is the LWM2M observe interface based on the CoAP protocol, then SCEF 100 initiates the observe procedure by sending a CoAP GET request with the observe option as defined in OMA TS-Lightweight M2M Transport specifications (see reference list below for complete citation). The handling of T8 messages to support the LWM2M observe call flow may be implemented using the CoAP gateway component as illustrated in FIG. 6.

Figure 6:
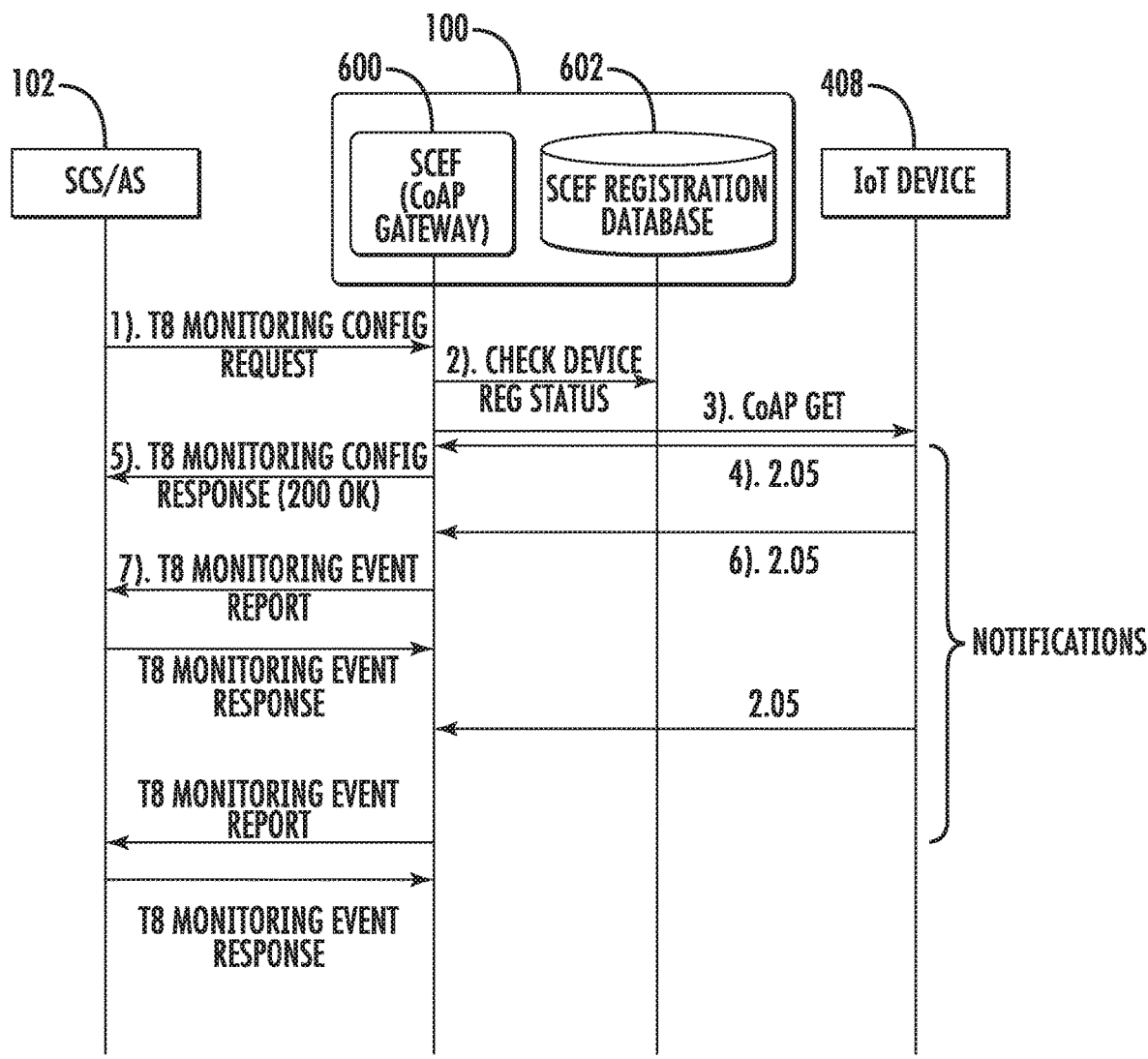
FIG. 6 is a message flow diagram illustrating implementing the LWM2M observe interface to monitor IoT device sensor data using the 3GPP defined northbound T8 interface.

In FIG. 6, SCEF 100 includes a CoAP gateway 600 and an IoT device registration database 602. CoAP gateway 600 may implement the functions of CoAP/MQTT gateway 402 on the southbound side of SCEF 100. CoAP gateway 600 may implement the functions of API gateway front end 418 on the northbound side of SCEF 100. IoT device registration database 602 stores device IDs of IoT devices, such as IoT device 408, that have registered to communicate with application servers and service capability servers in the network.

The following description corresponds to the message flow in FIG. 6.

1. SCS/AS 102 sends a monitoring configuration request (subscription request) to SCEF 100 to monitor the state of an IoT device
2. SCEF 100 determines the monitoring method to be the LWM2M observe call flow using a mapping configuration based on the device Id. Then, SCEF 100 performs a lookup in device registration database 602 to check if the UE identified in the monitoring event request has performed LWM2M registration with an LWM2M server and to retrieve the object/resource instance Ids. (The registration call flow is explained with respect to FIG. 7). SCEF 100 may cache or maintain in database 602 registration information indicating UEs that have registered to communicate with particular servers.
3. If the device is already registered, then SCEF 100 initiates the LWM2M Observe request using CoAP GET message with Observe option=0 for an Object, Object Instance, Resource or Resource Instance, which results in asynchronous notifications whenever that Object Instance changes (periodically or as a result of an event). A token of the CoAP layer is used to match the asynchronous notifications with the observe GET. SCEF 100 performs the mapping of the monitoring event type received in the T8 message to the resource Id using configurations and retrieves the object/resource instance from the registration database of step 2. SCEF 100 also starts a timer based on the monitoring duration received in the T8 monitoring config request. On expiry of timer, SCEF 100 initiates the cancellation of the subscribed (observed resource) towards the device. If the device is not registered with SCEF 100, then SCEF 100 rejects the T8 request by transmitting an error response to SCS/AS 102.
4. IoT device 408 sends notifications to SCEF 100 to notify SCS/AS 102 of changes in the subscribed resource Id using a 2.05 response code with the matching token specified by SCEF 100 in the observation request. The notification responses also include an Observe Option with a sequence number for ordering detected events.
5. On receiving the notification 2.05 CoAP response, SCEF 100 generates a T8 monitoring event status notification message towards SCS/AS 102 to notify SCS/AS 102 of the change in subscribed resource status of IoT device 408.

The same procedure is applied at SCEF 100 for any notifications received from IoT device 408. Table 1 below summarizes the mapping of 3GPP T8 to LWM2M protocol messages at SCEF 100:

TABLE 1

LWM2M Protocol to T8 Mappings

| LWM2M Operation | Direction | T8 Operation |
|---|---|---|
| Register(POST)/<br>RegisterUpdate(PUT)/ | Device to SCS/AS through SCEF | NIDD Uplink Notification or |

TABLE 1-continued

LWM2M Protocol to T8 Mappings

| LWM2M Operation | Direction | T8 Operation |
|---|---|---|
| RegisterDelete (DELETE) | | SCEF acting as a non-transparent CoAP proxy |
| Observe (GET) with observe option = 0 | SCS/AS to Device through SCEF | ME event subscription |
| Notify - Asynchronous Response (2.05 response code) | Device to SCS/AS through SCEF | ME event notification |
| Observe - cancel (GET) with observe option = 1 | SCS/AS to Device through SCEF | ME event subscription Delete |

On receiving the T8 monitoring event deletion request from SCS/AS 102 or on expiration of the timer set in Step 3, SCEF 100 sends an LWM2M observe cancel message using a CoAP GET request with observe option=1.

As stated above with regard to Table 1, one function performed by the SCEF is to map T8 messages and information elements to CoAP messages and IEs. Tables 2-6 illustrate mappings between T8 and CoAP parameters that may be implemented by the SCEF. In Tables 2-6, the direction MT indicates mobile terminated or communications towards the IoT device. The direction MO indicates mobile originated or communications from the IoT device to the network.

TABLE 2

CoAP (LWM2M)-T8 Mapping - Monitoring Event Subscription

| CoAP (LWM2M) Message | Direction | T8 Message | Notes |
|---|---|---|---|
| LWM2M Observer Get | MT | Monitoring Event Subscription | |
| N/A | | Self | |
| N/A | | supportedFeatures | |
| Ep client name urn: nai format | | externalid | |
| Ep client name urn: imei-msisdn | | MSISDN | |
| N/A | | externalGroupId | |
| N/A | | IPv4Addr | |
| N/A | | IPv6Addr | |
| | | notification-Destination | Stored in LWM2M server as notification destination |
| N/A | | requestTest-Notification | |
| N/A | | websockNotif-Config | |

TABLE 3

CoAP (LWM2M)-T8 Mapping - Monitoring Event Subscription (ctd.)

| CoAP (LWM2M) Message | Direction | T8 Message | Notes |
|---|---|---|---|
| LWM2M Observer Get | MT | Monitoring Event Subscription | |
| Object information | | monitoringType | Does not conform to |

TABLE 3-continued

CoAP (LWM2M)-T8 Mapping -
Monitoring Event Subscription (ctd.)

| CoAP (LWM2M) Message | Direction | T8 Message | Notes |
|---|---|---|---|
| to be monitored | | | monitoring types defined in T8 specification |
| N/A | | maximumNumberOfReports | |
| N/A | | MonitorExpireTime | |
| N/A | | groupReportGuardTime | |
| N/A | | MaximumDetectionTime | |
| N/A | | reachabilityType | |
| N/A | | maximumLatency | |
| N/A | | maximumResponseTime | |
| N/A | | requestTestNotifiication | |

TABLE 4

CoAP (LWM2M)-T8 Mapping -
Monitoring Event Subscription (ctd.)

| CoAP (LWM2M) Message | Direction | T8 Message | Notes |
|---|---|---|---|
| N/A | MT | Monitoring Event Subscription | |
| N/A | | suggestedNumberOFDIPackets | |
| N/A | | idleStatusIndication | |
| N/A | | locationType | |
| N/A | | Accuracy | |
| N/A | | minimumReportInterval | |
| N/A | | associationType | |
| N/A | | plmnIdentification | |
| N/A | | locationArea | |
| N/A | | monitoringEventReport | |

TABLE 5

CoAP (LWM2M)-T8 Mapping - Monitoring
Event Subscription (Response)

| CoAP (LWM2M) Message | Direction | T8 Message | Notes |
|---|---|---|---|
| LWM2M Observer Get Response | MT - Response | Monitoring Event Subscription Response | |
| | | MonitoringEvent-Subscription - self | Subscription id generated by LWM2M server |

TABLE 6

CoAP (LWM2M)-T8 Mapping - Monitoring Event Notification

| CoAP (LWM2M) message | Direction | T8 Message | Notes |
|---|---|---|---|
| LWM2M Notify Response 2.0x | MO | Monitoring Event Notification | |
| | | subscription | Subscription Id generated by LwM2M server in response to subscription request |
| N/A | | configResults | |
| N/A | | monitoringEventReports | |
| N/A | | cancelind | |
| Notification Data | | Custom HTTP Header: LWM2M-Observe-Notify-Data: <Data> | Since T8 does not specify a parameter to hold LWM2M like notification data, the data is sent in a custom header. |

Figure 7:
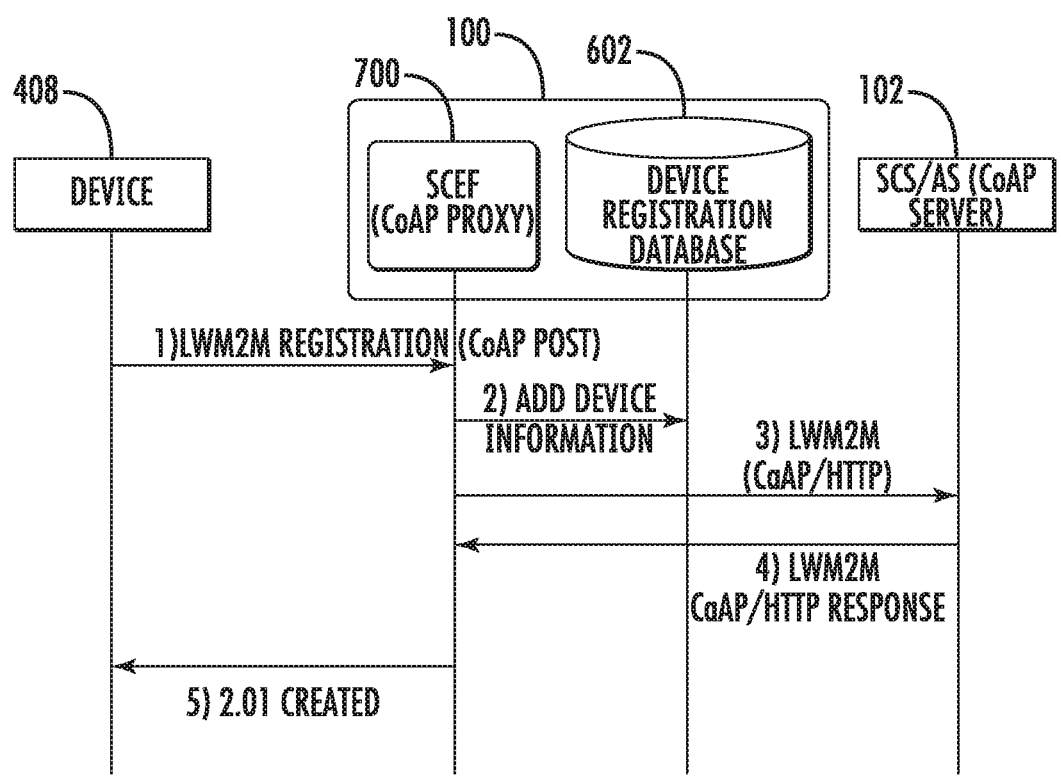

SCEF 100 may utilize LWM2M device registration information to populate its internal database. In one implementation SCEF 100 may act as a CoAP non-transparent proxy or cross proxy, intercepting LWM2M IoT device registration messages from an IoT Device towards the SCS/AS. SCEF 100 may store IoT device registration context information in an IoT device registration database maintained by SCEF 100. In one implementation, the registration context information may include the device identifier (device endpoint name), device address, registration lifetime, LWM2M version, and device resource information, which will be later used to deliver LWM2M observe messages when monitoring subscriptionT8 requests initiated from an SCS/AS. SCEF 100 may support following LWM2M registration operations:
Register
Update
De-register When SCEF 100 acts as a CoAP non-transparent proxy, SCEF 100 forwards received LWM2M CoAP messages to the SCS/AS. When acting as a cross proxy gateway, SCEF 100 can convert CoAP messages to HTTP messages and vice versa towards the SCS/AS. It should be noted that that SCEF 100 operates statelessly when acting as a proxy FIG. 7 illustrates an exemplary LWM2M registration call flow. Referring to FIG. 7, in line 1, IoT device 408 sends an LWM2M registration message to SCS/AS 102 via SCEF 100. In line 2, a CoAP proxy component 700 of SCEF 100 adds the device ID along with its associated registration state to device registration message 602. In line 3, CoAP proxy 700 of SCEF 100 sends the LWM2M registration message to SCS/AS 102. In line 4, SCS/AS 102 sends an LWM2M registration response to device 408 via SCEF 100. In line 5, CoAP proxy component 700 of SCEF 100 sends a 2.01 created message to IoT device 408 indicating that the registration was successful.

Figure 8A:
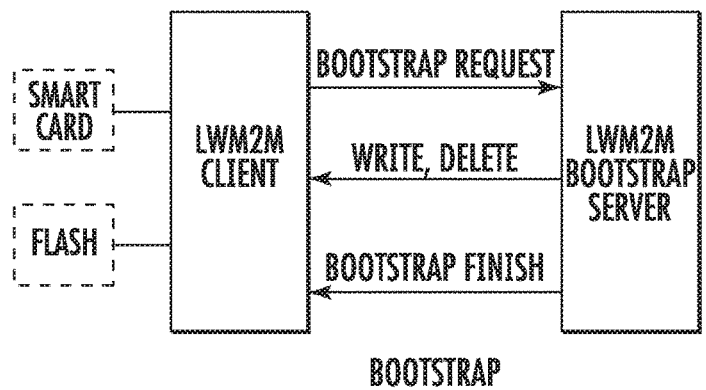
FIGS. 8A-8D are message flow diagrams illustrating exemplary LWM2M operations.
Figure 8B:
Figure 8C:
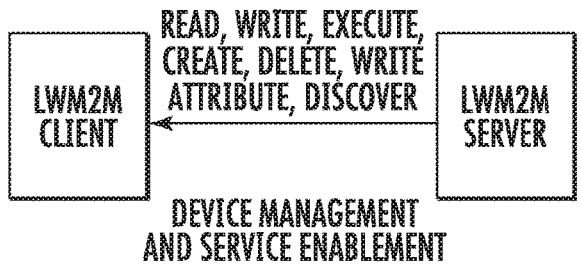
Figure 8D:
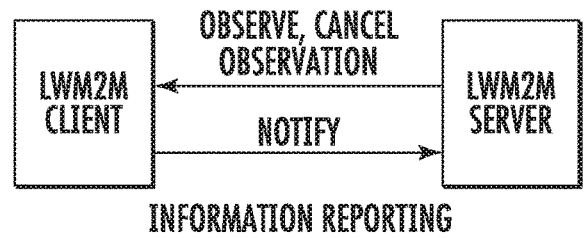

FIGS. 8A-8D illustrate exemplary LWM2M procedures. More particularly, FIG. 8A illustrates an LWM2M bootstrap procedure, FIG. 8B illustrates the LWM2M registration, update, and deregistration procedures, FIG. 8C illustrates the LWM2M server to client read, write, execute, delete, write attribute, and discover procedures. FIG. 8D illustrates the LWM2M observe, cancel observation, and notify procedures. As stated above, the SCEF may be interposed between the LWM2M server and the LWM2M client to enable the LWM2M server (SCS/AS) to communicate with LWM2M clients via the T8 interface of the SCEF. For example, for the LWM2M observe procedure, the SCS/AS sends a T8 monitoring configuration request to the SCEF, and the SCEF acts as a CoAP gateway and sends the corresponding CoAP messages to the IoT device being monitored.

Figure 9A:
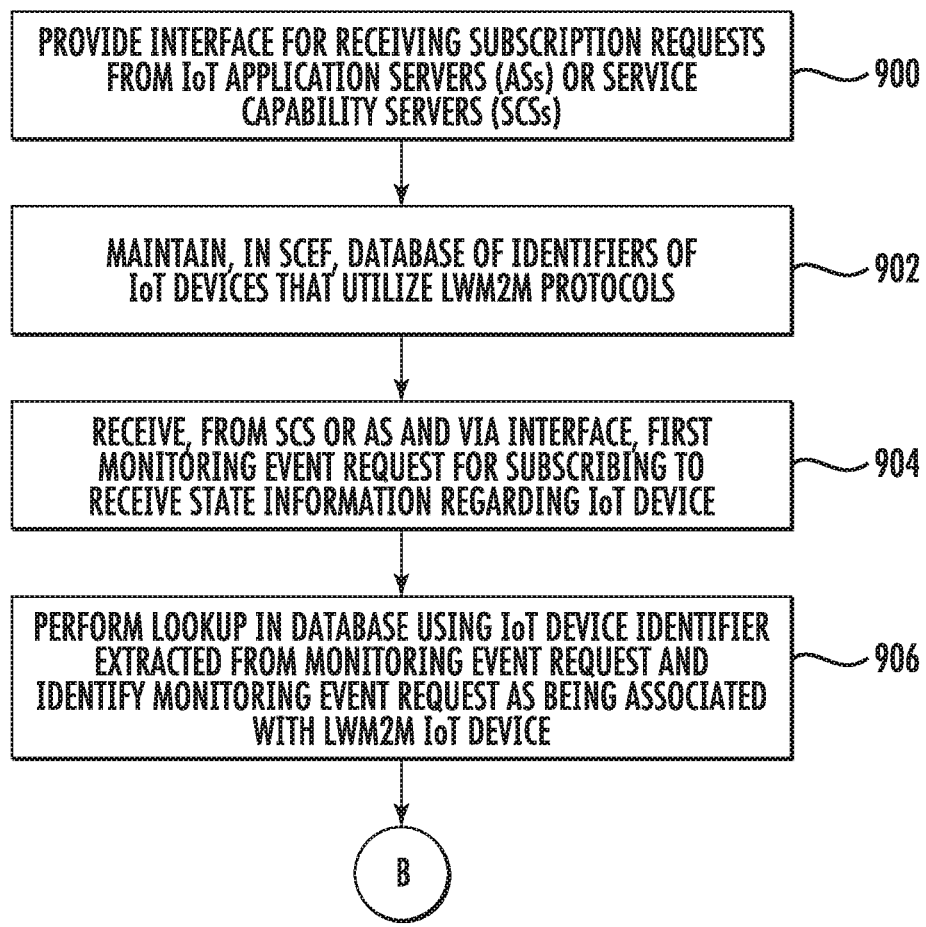
FIGS. 9A and 9B are a flow chart illustrating exemplary steps for implementing a common interface on an SCEF for obtaining status information for LWM2M and non-LWM2M IoT devices.
Figure 9B:
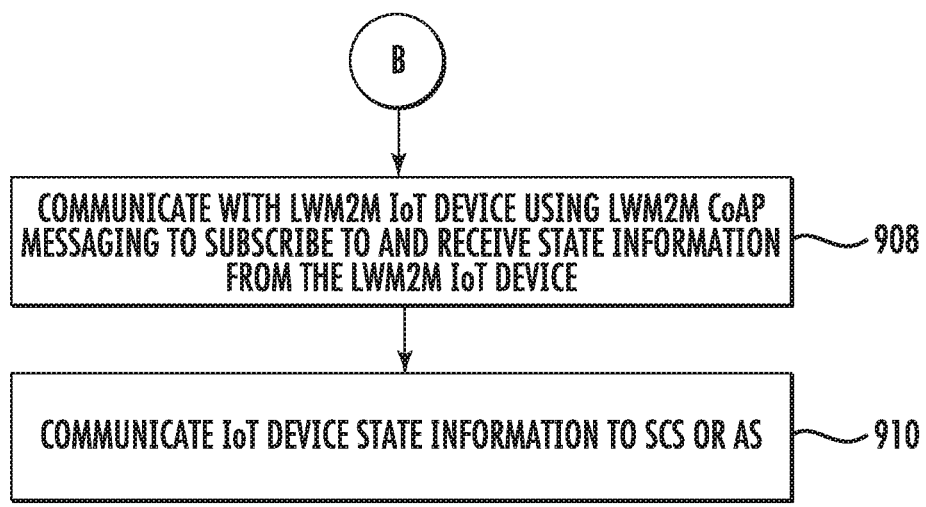

FIGS. 9A and 9B are a flow chart illustrating an exemplary process for implementing a common interface on an SCEF for obtaining status information for LWM2M and non-LWM2M IoT devices. Referring to FIG. 9A, in step 900, the process includes providing an interface for receiving subscription requests from IoT application servers (ASs) or service capability servers (SCSs) for monitoring LWM2M IoT device state. For example, the interface may be a T8 interface for receiving subscription requests for LWM2M and non-LWM2M devices.

In step 902, the process includes maintaining, in the SCEF, a database of identifiers of IoT devices that utilize LWM2M protocols. The database may be indexed by MSISDN number or external identifiers of LWM2M IoT devices.

In step 904, the method includes receiving from an SCS or AS and via the interface, a first monitoring event request for subscribing to receive state information regarding an IoT device. For example, an SCS/AS may send a 3GPP T8 monitoring event request to the SCEF via the T8 interface.

In step 906, the method includes performing a lookup in the database using an IoT device identifier extracted from the first monitoring event request and identifying the first monitoring event request as being associated with an LWM2M IoT device. For example, the SCEF may perform a lookup in its database using the MSISDN or other identifier extracted from the monitoring event request message and identify the request as being associated with an LWM2M device.

Referring to FIG. 9B, in step 908, the process includes communicating with the LWM2M IoT device using LWM2M constrained application protocol (CoAP) messaging to subscribe to and receive state information from the LWM2M IoT device. For example, the SCEF may implement the CoAP observe procedure to obtain state information from the IoT device.

In step 910, the process includes communicating the state information to the SCS or AS. For example, the SCEF may communicate the LWM2M device state information to the SCS/AS via the T8 interface using 3GPP T8 event notification messaging.

Advantages

Advantages of SCEF 100 include the fact that SCEF 100 provides a unified interface for an SCS/AS to monitor IoT devices, irrespective of the method of monitoring, i.e., 3GPP defined monitoring event procedure or LWM2M information reporting interface. Another advantage is that there is no need for a separate set of northbound APIs to be exposed by the mobile network operator (MNO) for the 3GPP-defined monitoring event procedure and the LWM2M-based observe call flows for monitoring IoT device state. Still another advantage is that MNOs will be able to perform access control for LWM2M-based northbound traffic from an SCS/AS at the SCEF.

Figure 3:
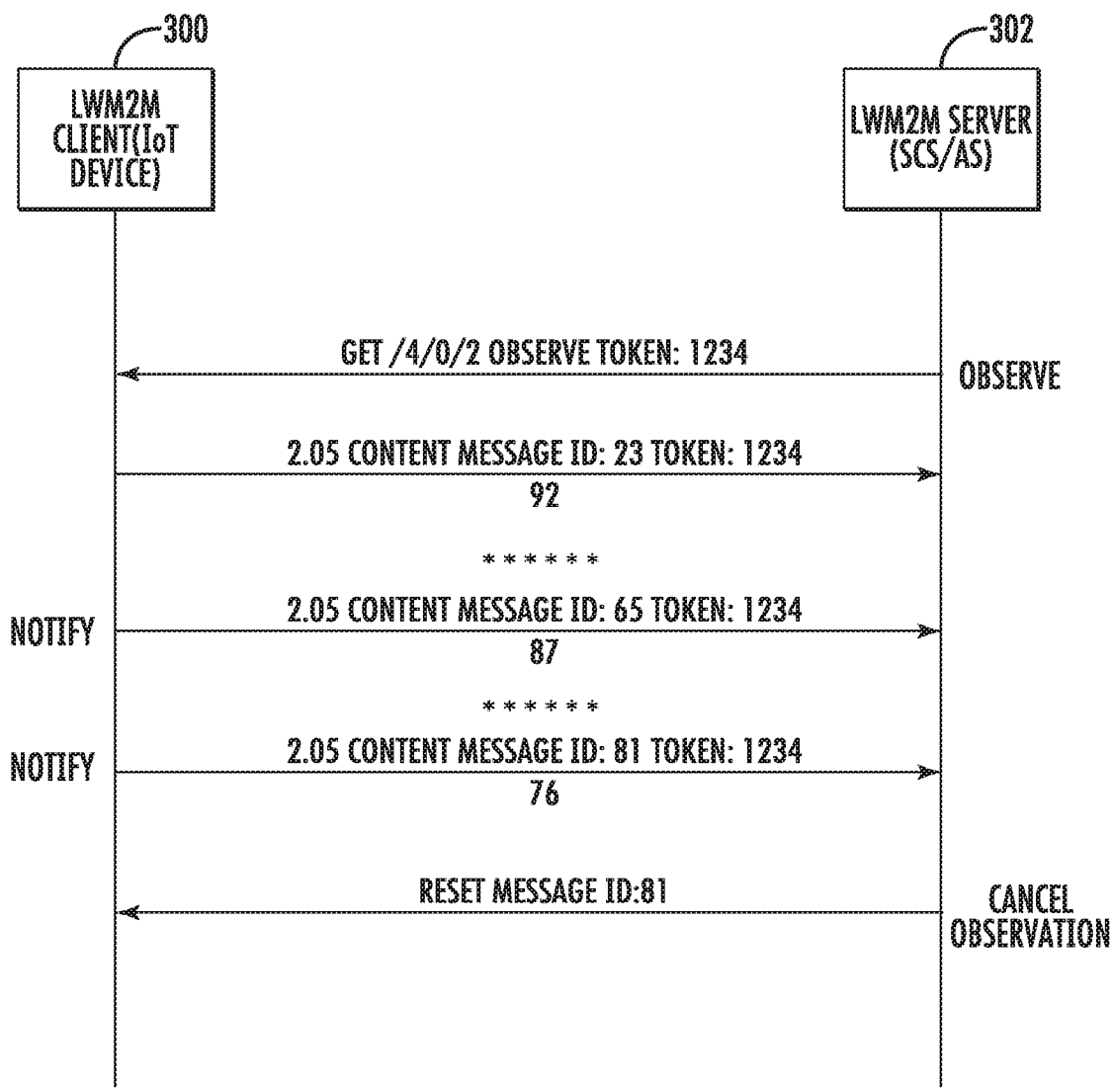
FIG. 3 is a message flow diagram illustrating CoAP messaging between an LWM2M server (implemented by an SCS/AS) and an LWM2M client.

Still another advantage is that SCEF 100 allows MNOs to perform authentication and authorization of an SCS/AS, even for LWM2M-based CoAP observe traffic at the SCEF. Any unauthorized traffic from an SCS/AS towards IoT devices will be blocked at the SCEF. Performing authorization of an SCS/AS at the SCEF was not possible in the conventional LWM2M call flow in FIG. 3 because LWM2M communications occur over an OTT path that does not involve the SCEF.

Still another advantage provided by SCEF 100 is that SCEF 100 allows MNOs to control the rate of northbound traffic from the SCS/AS at the SCEF. SCEF 100 not only prevents SCS/AS from over utilizing the MNO's network but also protects the MNO's network from overloading.

Use Cases

The subject matter described herein can be incorporated into an SCEF and provides enhanced functionality over SCEFs that do not include the unified interface. The enhanced SCEF enables operators to provide the unified interface for an SCS/AS to monitor the device irrespective of method of monitoring, i.e., 3GPP-defined monitoring event procedure or LWM2M information reporting interface. Implementing LWM2M gateway functionality in the SCEF also allows authentication and authorization of an SCS/AS to be performed at the SCEF.

Communication from low power IoT devices may be infrequent. Accordingly, SCEF 100 can handle communications from millions of IoT devices. SCEF 100 also provides a central location for monitoring IoT device traffic.

The disclosure of each of the following references is incorporated herein by reference in its entirety.

References (1) IETF RFC 7252, The Constrained Application Protocol (CoAP) (June 2014)
(2) IETF RFC 7641, Observing Resources in the Constrained Application Protocol (CoAP) (September 2015)
(3) IETF RFC 7959, Block-wise Transfers in the Constrained Application Protocol (CoAP) (August 2016)
(4) 3GPP TS 29.122, Technical Specification Group Core Network and Terminals; T8 reference point for Northbound APIs; (Release 16) V16.1.0(March 2019)
(5) 3GPP TS 29.336, Technical Specification Group Core Network and Terminals; Home Subscriber Server (HSS) diameter interfaces for interworking with packet data networks and applications (Release 15) V15.6.0 (March 2019)
(6) 3GPP TS 23.682, Technical Specification Group Services and System Aspects; Architecture enhancements to facilitate communications with packet data networks and applications (Release 16), V16.2.0 (March 2019)
(7) OMA Lightweight Machine to Machine Requirements, Candidate Version 1.2-24, Open Mobile Alliance (January 2019)
(8) OMA Lightweight Machine to Machine Technical Specification: Core, Candidate Version: 1.1-12, Open Mobile Alliance (June 2018)
(9) OMA Lightweight Machine to Machine Technical Specification: Transport Bindings Candidate Version: 1.1-12, Open Mobile Alliance (June 2018)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for monitoring light weight machine to machine (LWM2M) Internet of things (IoT) device state, the method comprising:
in a service capability exposure function (SCEF) including at least one processor:
  providing an interface for receiving subscription requests from IoT application servers (ASs) or service capability servers (SCSs) for monitoring LWM2M IoT device state;

maintaining, in the SCEF, a database of identifiers of IoT devices that utilize LWM2M protocols;
receiving, via the interface and from an SCS or AS, a first monitoring event request for subscribing to receive state information regarding an IoT device;
performing a lookup in the database using an IoT device identifier extracted from the first monitoring event request and identifying the first monitoring event request as being associated with an LWM2M IoT device;
communicating with the LWM2M IoT device using LWM2M constrained application protocol (CoAP) messaging to subscribe to and receive state information from the LWM2M IoT device; and
communicating the state information to the SCS or AS.

2. The method of claim 1 wherein the interface comprises a T8 interface.

3. The method of claim 2 comprising receiving a second monitoring event request via the T8 interface, performing a lookup in the database using an IoT device identifier extracted from the second monitoring event request, identifying the second monitoring event request as being associated with a non-LWM2M IoT device, and communicating with a public land mobile network (PLMN) network node using 3GPP event monitoring procedures to subscribe to and receive state information regarding the non-LWM2M IoT device.

4. The method of claim 2 wherein receiving the monitoring event request includes receiving a 3GPP T8 monitoring event request.

5. The method of claim 2 wherein communicating with the LWM2M device includes implementing an LWM2M observe procedure to subscribe to receive state information regarding the LWM2M IoT device.

6. The method of claim 5 wherein implementing the LWM2M observe procedure includes sending a CoAP GET request with an observe option from the SCEF to the LWM2M IoT device.

7. The method of claim 5 wherein implementing the LWM2M observe procedure includes receiving a 2.05 CoAP response including the state information from the LWM2M IoT device and generating and sending a T8 monitoring event response message including the state information to the SCS or AS.

8. The method of claim 1 comprising maintaining, in the SCEF, a registration database of LWM2M IoT devices registered with the SCEF.

9. The method of claim 1 comprising providing a single IoT service application programming interface (API) for receiving monitoring event subscription requests for LWM2M and non-LWM2M IoT devices.

10. The method of claim 1 wherein communicating with the LWM2M IoT device includes communicating with the LWM2M IoT device using an over the top (OTT) communication path via a serving gateway or packet gateway and an evolved node B (eNB).

11. A system for monitoring light weight machine to machine (LWM2M) Internet of things (IoT) device state, the system comprising:
a service capability exposure function (SCEF) including at least one processor;
an interface provided by the SCEF for receiving subscription requests from IoT application servers (ASs) or service capability servers (SCSs) for monitoring LWM2M IoT device state;
a database in the SCEF of identifiers of IoT devices that utilize LWM2M protocols;
an application programming interface (API) front end (FE) in the SCEF for receiving, via the interface and from an SCS or AS, a first monitoring event request for subscribing to receive state information regarding an IoT device, performing a lookup in the database using an IoT device identifier extracted from the first monitoring event request and identifying the first monitoring event request as being associated with an LWM2M IoT device;
a constrained application protocol/message queuing telemetry transport (CoAP/MQTT) gateway in the SCEF for communicating with the LWM2M IoT device using LWM2M CoAP messaging to subscribe to and receive state information from the LWM2M IoT device; and
a core SCEF API handler in the SCEF for communicating the state information to the SCS or AS.

12. The system of claim 11 wherein the interface comprises a T8 interface.

13. The system of claim 12 wherein the SCEF is configured to receive a second monitoring event request via the T8 interface, perform a lookup in the database using an IoT device identifier extracted from the second monitoring event request, identify the second monitoring event request as being associated with a non-LWM2M IoT device, and communicate with a public land mobile network (PLMN) network node using 3GPP event monitoring procedures to subscribe to and receive state information regarding the non-LWM2M IoT device.

14. The system of claim 12 wherein receiving the monitoring event request includes receiving a 3GPP T8 monitoring event request.

15. The system of claim 12 wherein communicating with the LWM2M device includes implementing an LWM2M observe procedure to subscribe to receive state information regarding the LWM2M IoT device.

16. The system of claim 15 wherein implementing the LWM2M observe procedure includes sending a CoAP GET request with an observe option from the SCEF to the LWM2M IoT device.

17. The system of claim 15 wherein implementing the LWM2M observe procedure includes receiving a 2.05 CoAP response including the state information from the LWM2M IoT device and generating and sending a T8 monitoring event response message including the state information to the SCS or AS.

18. The system of claim 11 comprising a registration database in the SCEF of LWM2M IoT devices registered with the SCEF.

19. The system of claim 11 comprising a single IoT service application API for receiving monitoring event subscription requests for LWM2M and non-LWM2M IoT devices.

20. A non-transitory computer readable medium having stored thereon executable instructions that when executed by a processor of a computer control the computer to perform steps comprising:
in a service capability exposure function (SCEF) including at least one processor:
providing an interface for receiving subscription requests from IoT application servers (ASs) or service capability servers (SCSs) for monitoring light weight machine to machine (LWM2M) Internet of things (IoT) device state;
maintaining, in the SCEF, a database of identifiers of IoT devices that utilize LWM2M protocols;

receiving, via the interface and from an SCS or AS, a first monitoring event request for subscribing to receive state information regarding an IoT device;

performing a lookup in the database using an IoT device identifier extracted from the first monitoring event request and identifying the first monitoring event request as being associated with an LWM2M IoT device;

communicating with the LWM2M IoT device using LWM2M constrained application protocol (CoAP) messaging to subscribe to and receive state information from the LWM2M IoT device; and communicating the state information to the SCS or AS.

\* \* \* \* \*

UNITED STATES PATENT AND TRADEMARK OFFICE
CERTIFICATE OF CORRECTION

| | |
|---|---|
| PATENT NO. | : 10,742,744 B1 |
| APPLICATION NO. | : 16/399428 |
| DATED | : August 11, 2020 |
| INVENTOR(S) | : Mahalank et al. |

It is certified that error appears in the above-identified patent and that said Letters Patent is hereby corrected as shown below:

On the Title Page

Column 1, under Title, Line 6, delete "FUNTION" and insert -- FUNCTION --, therefor.

On page 2, Column 2, under Other Publications, Line 48, delete "Singaling" and insert -- Signaling --, therefor.

In the Specification

In Column 1, Line 6, delete "FUNTION" and insert -- FUNCTION --, therefor.

In Column 2, Line 4, after "100" insert -- . --.

In Column 2, Line 35, after "100" insert -- . --.

In Column 8, Line 55, after "above)" insert -- . --.

In Column 9, Line 11, after "device" insert -- . --.

In Column 11, under TABLE 3-continued, Line 17, delete "Notifiication" and insert -- Notification --, therefor.

In Column 11, under TABLE 6, Line 64, delete "LwM2M" and insert -- LWM2M --, therefor.

In Column 12, Line 41, delete "that that" and insert -- that --, therefor.

In Column 12, Line 42, after "proxy" insert -- . --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*